US009565567B2

(12) United States Patent
Chaves et al.

(10) Patent No.: US 9,565,567 B2
(45) Date of Patent: Feb. 7, 2017

(54) METHOD AND APPARATUS TO COORDINATE SIMULTANEOUS TRANSMISSION IN OVERLAPPING WIRELESS NETWORKS

(71) Applicant: Nokia Corporation, Espoo (FI)

(72) Inventors: Fabiano de Sousa Chaves, Manaus (BR); Sayantan Choudhury, Berkeley, CA (US); Fuad Mousse Abinader, Jr., Manaus (BR); Andre Mendes Cavalcante, Manaus (BR); Erika Portela Lopes de Almeida, Brasilia (BR); Esa Tuomaala, El Cerrito, CA (US); Klaus F. Doppler, Albany, CA (US); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 392 days.

(21) Appl. No.: 14/211,817

(22) Filed: Mar. 14, 2014

(65) Prior Publication Data

US 2015/0264578 A1    Sep. 17, 2015

(51) Int. Cl.
*H04W 16/14* (2009.01)
*H04W 74/08* (2009.01)
*H04W 84/12* (2009.01)

(52) U.S. Cl.
CPC ......... *H04W 16/14* (2013.01); *H04W 74/0808* (2013.01); *H04W 74/0816* (2013.01); *H04W 84/12* (2013.01)

(58) Field of Classification Search
None
See application file for complete search history.

(56) References Cited

U.S. PATENT DOCUMENTS 7,764,658 B2 * 7/2010 Garrett ................. H04L 5/0037
                                                          370/203
8,126,007 B2 * 2/2012 Nandagopalan .. H04W 74/0816
                                                          370/329

(Continued)

FOREIGN PATENT DOCUMENTS

WO    WO-2010/150143 A1    12/2010
WO    WO-2015/121529 A1    8/2015

OTHER PUBLICATIONS

Lee, Daewon, et al., "Coordinated Multipoint Transmission and Reception in LTE-Advanced Deployment Scenarios and Operational Challenges", IEEE Communications Magazine, Feb. 2012, pp. 148-155.

(Continued)

*Primary Examiner* — Ayaz Sheikh
*Assistant Examiner* — Faiyazkhan Ghafoerkhan
(74) *Attorney, Agent, or Firm* — Harrington & Smith

(57) ABSTRACT

In one aspect the embodiments of the invention provide a method that includes transmitting a first frame comprising a first type of message from a first node for reception by a second node. The first node is associated with a first wireless communication system and the second node is associated with a second wireless communication system. The first type of message includes a first information element for identifying the second node and a second information element for specifying that the first frame is transmitted to initiate a request for simultaneous transmission by the first node and by the second node. The first frame is also received by a third node that is part of the first wireless communication system. The method further includes receiving from the third node a second frame that includes a second type of message. The second type of message identifies the second node and specifies, based on a measurement performed by the third node on the first frame and a measurement performed by the (Continued)

third node on a third frame transmitted by the second node, whether the request for simultaneous transmission is accepted or is not accepted by the third node. The method further includes transmitting a fourth frame that includes the second type of message from the first node for reception by the second node. The second type of message identifies the second node and specifies that the request for simultaneous transmission was accepted by the third node.

23 Claims, 5 Drawing Sheets

(56) References Cited

U.S. PATENT DOCUMENTS

| | | | | |
|---|---|---|---|---|
| 8,195,844 | B2* | 6/2012 | Fulton | G05B 19/05 710/15 |
| 2005/0190784 | A1* | 9/2005 | Stine | H04L 45/40 370/445 |
| 2008/0310348 | A1* | 12/2008 | Nandagopalan | H04W 74/0816 370/328 |
| 2009/0083589 | A1* | 3/2009 | Fulton | G05B 19/05 714/48 |
| 2009/0296591 | A1* | 12/2009 | Urabe | H04W 74/0808 370/252 |
| 2010/0017537 | A1* | 1/2010 | Linnartz | H04W 40/24 709/241 |
| 2011/0201341 | A1* | 8/2011 | Choudhury | H04W 72/0426 455/450 |
| 2011/0222408 | A1* | 9/2011 | Kasslin | H04L 41/083 370/241 |
| 2012/0106436 | A1* | 5/2012 | Argyriou | H04W 74/0816 370/315 |
| 2012/0314590 | A1* | 12/2012 | Choudhury | H04B 7/0452 370/252 |
| 2013/0021925 | A1* | 1/2013 | Yin | H04B 7/024 370/252 |
| 2013/0039283 | A1* | 2/2013 | Khoshnevis | H04B 7/024 370/329 |
| 2013/0077555 | A1* | 3/2013 | Gao | H04L 1/1887 370/312 |
| 2014/0112175 | A1* | 4/2014 | Pantelidou | H04W 28/26 370/252 |
| 2014/0241317 | A1* | 8/2014 | Jamadagni | H04W 76/025 370/331 |
| 2015/0078356 | A1* | 3/2015 | Kwon | H04W 74/0816 370/338 |
| 2015/0124784 | A1* | 5/2015 | Choi | H04W 74/04 370/336 |
| 2015/0288427 | A1* | 10/2015 | Wang | H04W 72/1273 370/329 |

OTHER PUBLICATIONS

Li, Yunzhou, et al., "Feasibility of Coordinated Transmission for HEW", IEEE 802.11-13/1157r3, Sep. 18, 2013, 18 pgs.

Chen, Li, et al., "Inter-Cell Coordinated Resource Allocation for Mobile WiMAX System", WCNC 2009 IEEE 2009, 6 pgs.

IEEE Std 802.11ac, "Part 11: Wireless LAN Medium Access Control (MAC) and Physical Layer (PHY) Specifications—Amendment 4: Enchancements for Very High Throughput for Operation in Bands below 6 GHz", 2013, 425 pgs.

IEEE Std 802.11k, "Part 11: Wireless Medium Access Control (MAC) and Physical Layer (PHY) Specifications: Specification for Radio Resource Measurement", Jul. 2004, 110 pgs.

IEEE Std 802.11n, "Part 11: Wireless LAN Medium Access Control (MAC) and Physical Layer (PHY) Specifications—Amendment 5: Enhancement for Higher Throughput", 2009, 536 pgs.

IEEE Std 802.11vf, "Part 11: Wireless LAN Medium Access Control (MAC) and Physical Layer (PHY) Specifications—Amendment 8: Wireless Network Management", 2008, 350 pgs.

* cited by examiner

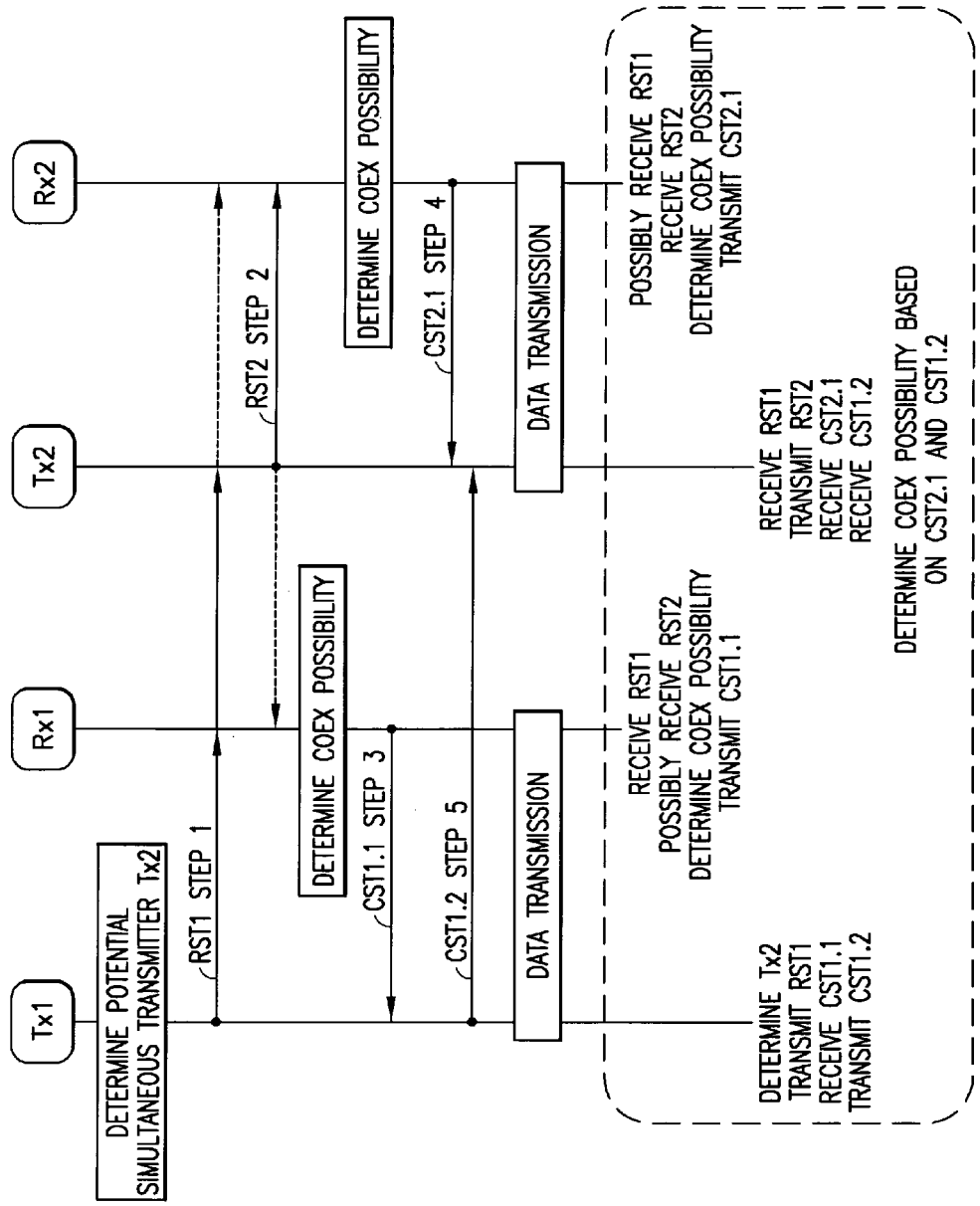

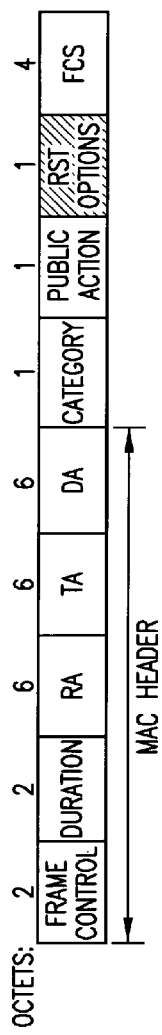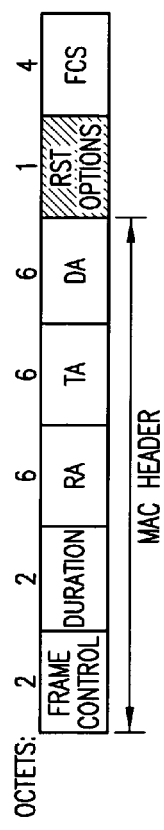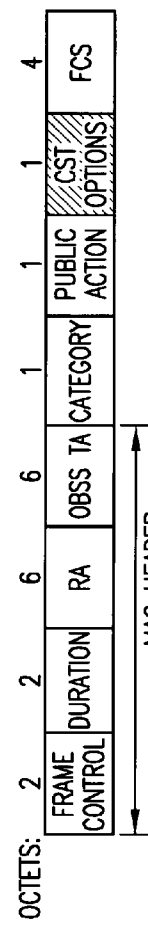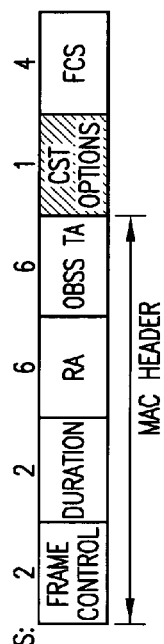

METHOD AND APPARATUS TO COORDINATE SIMULTANEOUS TRANSMISSION IN OVERLAPPING WIRELESS NETWORKS

TECHNICAL FIELD

The examples and non-limiting embodiments of this invention relate generally to wireless communication systems, methods, devices and computer programs and, more specifically, relate to signaling to coordinate transmissions of transmitters in overlapped coverage areas.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AP: Wi-Fi Access Point
BSS: Basic Service Set
CdW: Contention Window
CCA: Clear Channel Assessment
CST: Clear-to-Simultaneous-Transmission
DCF: Distributed Coordination Function
DIFS: DCF Interframe Space
FCS: Frame Check Sequence (Cyclic Redundancy Check (CRC))
LTE: Long Term Evolution
MAC: Medium Access Control
MCS: Modulation Coding Scheme
NAV: Network Allocation Vector
OBSS: Overlapping-BSS
RA: Receiver Address
RST: Request-Simultaneous-Transmission
SIFS: Short Interframe Space
STA: Wi-Fi Station (non AP)
STW: Simultaneous Transmission Window
TA: Transmitter Address The IEEE 802.11 standard for Wireless Local Area Networks (WLANs), commonly known as Wi-Fi, has been broadly adopted to provide users with wireless broadband access to the Internet. With the increase on the demand for wireless Internet access, dense Wi-Fi deployments have become more common in both residential and office environments. For a dense Wi-Fi deployment there can be a high density of Wi-Fi terminals and networks operating without coordination and with overlapping coverage.

In a typical mode of Wi-Fi operation an Access Point (AP) bridges a Basic Subscriber Set (BSS) of wireless stations (STAs) to a wired Ethernet network. Wi-Fi uses a contention-based channel access protocol known as Carrier Sensing Multiple Access with Collision Avoidance (CSMA/CA). In CSMA/CA operation Wi-Fi nodes need to 'listen' to a channel prior to transmitting. This procedure is known as Clear Channel Assessment (CCA). Nodes in CCA may receive transmissions from one or more other nodes. These received transmissions are understood to indicate that the channel is occupied. In response to the channel being occupied the node defers its own transmission for some random duration of time (known as backoff).

One approach employs DCF that uses a CSMA/CA with a binary exponential backoff algorithm. DCF requires a station wishing to transmit to listen for the channel status for a DIFS interval. If the channel is found busy during the DIFS interval, the station defers its transmission. In a network where a number of stations contend for the wireless medium, if multiple stations sense the channel busy and defer their access, they will also virtually simultaneously find that the channel is released and then try to seize the channel. As a result, collisions may occur. In order to avoid such collisions, DCF also specifies random backoff, which forces a station to defer its access to the channel for an extra period.

As can be appreciated the backoff situation occurs more frequently in a dense deployment with overlapping BSSs (OBSSs), which causes a degradation of Wi-Fi performance in terms of throughput, latency and user quality of service (QoS).

SUMMARY

The foregoing and other problems are overcome, and certain advantages are realized, in accordance with the examples of the embodiments of this invention.

In a first aspect thereof the embodiments of the invention provide a method that includes transmitting a first frame comprising a first type of message from a first node for reception by a second node, where the first node is associated with a first wireless communication system and the second node is associated with a second wireless communication system. The first type of message comprises a first information element for identifying the second node and a second information element for specifying that the first frame is transmitted to initiate a request for simultaneous transmission by the first node and by the second node. The first frame is also received by a third node that comprises part of the first wireless communication system. Receiving from the third node a second frame comprising a second type of message, the second type of message identifying at least the first node and specifying, based on a measurement performed by the third node on the first frame and a measurement performed by the third node on a third frame transmitted by the second node, whether the request for simultaneous transmission is accepted or is not accepted by the third node. Transmitting a fourth frame comprising the second type of message from the first node for reception by the second node, the second type of message identifying the second node and specifying that the request for simultaneous transmission was accepted by the third node.

In another, second aspect the embodiments of the invention provide a method that includes receiving from a first node at a second node a first frame comprising a first type of message, the first node being associated with a first wireless communication system and the second node being associated with a second wireless communication system. The first type of message comprises a first information element for identifying the second node and a second information element for specifying that the first frame was transmitted to initiate a request for simultaneous transmission by the first node and by the second node. The first frame is also addressed to a third node that comprises part of the first wireless communication system. Transmitting from the second node to a fourth node a second frame comprising the first type of message, the second frame identifying the first node and specifying that the second frame is transmitted in response to the first frame that was received by the second node. The fourth node comprises part of the second wireless communication system. The method further includes receiving at the second node, based on a measurement performed by the fourth node on at least the second frame, a third frame comprising a second type of message. The second type of message identifies the first node and comprises an indication whether the request for simultaneous transmission is accepted or is not accepted by fourth node. The method further includes receiving at the second node a fourth frame comprising the second type of message, where the second type of message identifies the second node and comprises an indication whether the request for simultaneous transmission was accepted by the third node. The method further includes making a determination at the second node, based on the received third frame and the received fourth frame, whether to perform a simultaneous transmission with the first node.

In another, third aspect the embodiments of the invention provide a method that includes receiving at a third node a first frame comprising a first type of message transmitted from a first node for reception by a second node. The first node and the third node are associated with a first wireless communication system and the second node is associated with a second wireless communication system. The first type of message comprises a first information element for identifying the second node and a second information element for specifying that the first frame is transmitted to initiate a request for simultaneous transmission by the first node and by the second node. The method further includes transmitting from the third node to the first node a second frame comprising a second type of message, where the second type of message identifies the second node and specifies, based on a measurement performed by the third node on the first frame and a measurement performed by the third node on a second frame transmitted by the second node in response to receiving the first frame, whether the request for simultaneous transmission is accepted or is not accepted by the third node.

Further in accordance with this invention apparatus are provided configured to operate in accordance with the first, second and third aspects of this invention as detailed above.

Further in accordance with this invention there are provided various non-transitory computer-readable medium containing software program instructions, where execution of the software program instructions by at least one data processor results in performance of operations that comprise execution of the methods in accordance with the first, second and third aspects of this invention as detailed above. The various computer-readable medium and the data processors that execute the software program instructions can each form a part of the apparatus configured to operate in accordance with the first, second and third aspects of this invention.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIG. 5 is a signaling diagram and logic flow diagram that presents another view of the signaling mechanism depicted in FIG. 4.

FIGS. 6-9 illustrate alternative embodiments of frame structures, where:

FIG. 6 shows the RST frame when embodied as a Public Action frame with the OBSS TA information element, renamed as Destination Address (DA), moved to the MAC header portion;

FIG. 7 shows the RST frame when embodied as a Control frame with the MAC header portion modified as in FIG. 6;

FIG. 8 shows the CST frame when embodied as a Public Action frame with the OBSS TA information element moved to the MAC header portion; and FIG. 9 shows the CST frame when embodied as a Control frame with the MAC header portion modified as in FIG. 8.

DETAILED DESCRIPTION

As was indicated above a common Wi-Fi operational mode is based on the CSMA/CA channel access protocol. The CSMA/CA channel access protocol is known to present poor performance for networks with a large number of Wi-Fi nodes due to increased time that is wasted due to CCA and backoff. The probability of collisions increases when a large number of communication nodes contend for channel access and, as a consequence, the CCA time becomes longer. This type of behavior is observed in a single BSS.

This situation becomes more problematic in OBSS scenarios where Wi-Fi nodes contend for the channel also with other BSS nodes. Mechanisms exist for attempting to minimize performance degradation due to excessive CCA and backoff. In some Wi-Fi operational modes, such as Point Coordination Function (PCF), Hybrid Controlled Channel Access (HCCA) and Power-Save Multi-Poll (PSMP), the AP coordinates transmissions during contention-free periods for its associated STAs in the BSS. However, the PCF, HCCA and PSMP operational modes are intra-BSS mechanisms, i.e., they do not solve or minimize the problem in the OBSS scenario.

Figure 1:
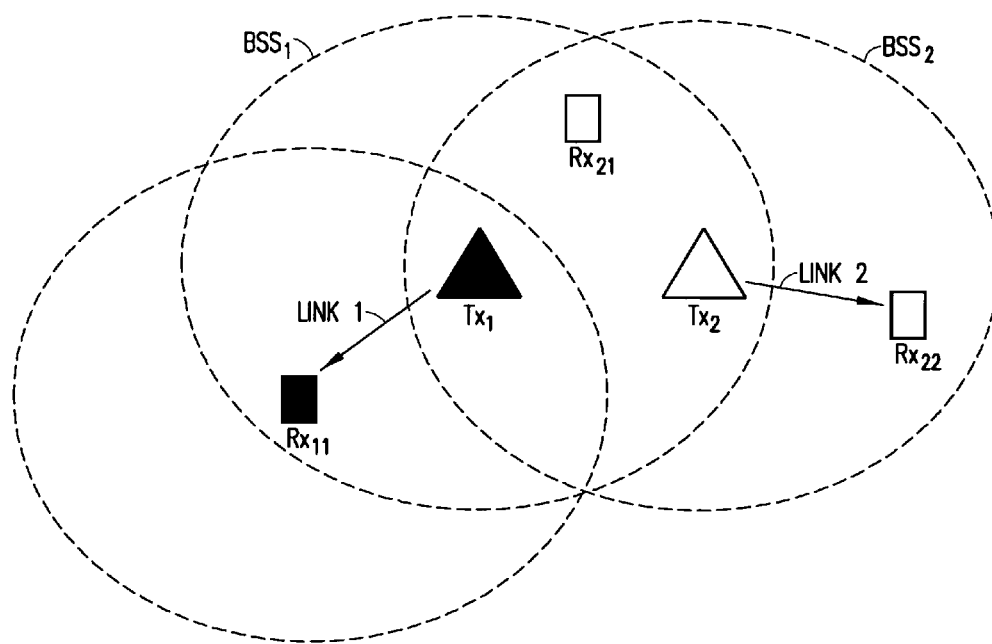
FIG. 1 shows an example of OBSS simultaneous transmission.

FIG. 1 illustrates an inefficient use of a channel in the OBSS scenario. In this Figure two overlapping BSSs are shown ($BSS_1$ and $BSS_2$). In a typical operation, due to CCA Link 1 and Link 2 (from different BSSs) are mutually exclusive if Tx1 or Tx2 first gains access to the channel.

However, it can be noted that the simultaneous transmission of Link 1 and Link 2, if coordinated (i.e., by setting the transmission time duration), could be beneficial since the transmission of one BSS does not adversely affect the reception of the other BSS. This approach would tend to increase channel usage efficiency.

Interference management through coordinated transmission has been the focus of several studies by 3GPP for LTE-Advanced (referred to therein as Coordinated Multipoint, CoMP) as well by IEEE for certain 802.16 standards. In these previous approaches the concept of coordinated transmission refers to a wide range of techniques that enable dynamic coordination of transmission and reception with multiple geographically separated base stations (i.e., eNBs in the LTE system).

Specifically for 4G LTE networks, the use of CoMP requires close coordination between a number of geographically separated eNBs. The eNBs dynamically coordinate to provide joint scheduling and transmissions as well as to provide joint processing of received signals. In this manner a single User-Equipment (UE) is able to be served by two or more eNBs to improve signal reception/transmission and increase throughput. This approach can be particularly beneficial when the UE is located at or near the edge of a cell.

In order to support this type of operation highly detailed and fast feedback is required on the channel properties so that changes can be made. In addition, very close coordination is needed between the eNBs to facilitate the combination of data or fast switching of the cells. In general the techniques used for CoMP are different for the uplink (UL) and for the downlink (DL). The UL/DL difference results from the fact that the eNBs are in a network, connected to other eNBs, whereas the handsets or UEs are individual autonomous elements.

For Wi-Fi networks coordinated transmission has only recently been discussed in IEEE High Efficiency WLAN Study Group (HEW SG) in the proposal (HEW-SG doc: IEEE 802.11-13/1157r3—Feasibility of Coordinated Transmission for HEW). In this proposal the feasibility of using coordinated transmissions between adjacent APs for future WLAN networks is considered. The potential gain derived from coordinated transmission is analyzed and simple coordinated schemes are introduced. However, the discussed approach requires a centralized network element, referred to as an Access Controller (AC), to coordinate transmissions between adjacent APs. This approach is thus not an autonomous technique and also increases wireless network complexity.

It should be apparent that Wi-Fi OBSS presents a challenging wireless network scenario (which is becoming more common), and that OBSS transmission coordination is a mechanism that should be exploited in Wi-Fi networks to allow more efficient operation.

The embodiments of this invention provide a signaling mechanism for achieving OBSS transmission coordination. The use of the various embodiments of this invention enables an improved user/network performance in dense Wi-Fi deployments.

One non-limiting example of a dense WiFi deployment could occur in an apartment building, where individual apartments on the same and adjacent floors each include, for example, a wireless router and one or more WiFi devices such as phones and/or laptops. The wireless router and connected device(s) of each apartment may be considered as a BSS and, due to spatial proximity, the BSSs associated with two or more adjacent apartments can overlap with one another. Note that each BSS could be considered as an independent and autonomous wireless communication system.

The embodiments of this invention provide an efficient signaling mechanism to coordinate two simultaneous transmissions for OBSS Wi-Fi nodes (APs and/or STAs) and can be used to advantage in WiFi dense deployments. The embodiments of the invention employ an exchange of management or control frames between transmitter/receiver pairs in the two OBSSs in order to create a coordination window and to protect an initial (starter) transmission from collisions. The embodiments of the invention use exchanged management or control frames to estimate the signal strength at both receivers (one in each BSS) due to both transmitters (one in each BSS), and based on one or more criterion (minimum signal to interference plus noise (SINR) at the receiver, for example) determine whether a second (simultaneous) transmission is admitted. The embodiments of the invention also protect the second transmission if it is admitted and/or if the starter transmission fails.

Assuming that the management or control frames are correctly decoded a pioneering transmission (transmitter/receiver link initiating the process) is guaranteed to occur, while the second transmission occurs only if both receivers admit the parallel transmission. If the starter transmission link fails in its management or control frame exchange, then the second transmission link gains access to the channel.

It should be appreciated that while the embodiments of this invention are described primarily in the context of WiFi networks the embodiments are not limited for use with only WiFi networks, and instead can be applied to a variety of different types of wireless communications networks and systems. Further, while described at least partially in the context of the coordination of the transmissions from APs and more generally base stations, the embodiments of this invention pertain to the coordination of the transmissions from transmitters in general.

The embodiments of this invention introduce two new management (Public Action) or control frames, which are assumed to be understood by other BSS Wi-Fi nodes, to carry out the signaling. A first frame conveys as a message a Request-Simultaneous-Transmission (RST), while the second frame conveys as a message a Clear-to-Simultaneous-Transmission (CST). These messages could be referred to by different names without affecting their underlying functionality.

The described signaling mechanism in accordance with the embodiments of this invention beneficially implements a decentralized coordination of OBSS Wi-Fi transmissions, and presents a novel method of signaling exchange to coordinate OBSS Wi-Fi transmissions.

Figure 2:
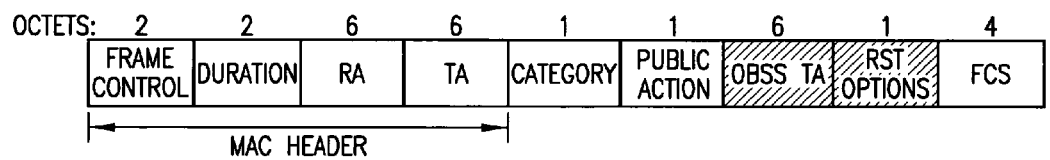
FIG. 2 shows, in accordance with an aspect of this invention, a Public Action frame Request-Simultaneous-Transmission (RST).
Figure 3:
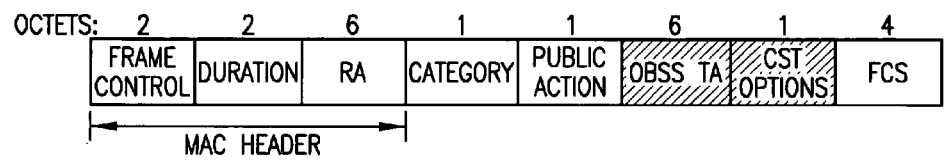
FIG. 3 shows, further in accordance with an aspect of this invention, a Public Action frame Clear-to-Simultaneous-Transmission (CST).

The novel signaling mechanism for enabling simultaneous transmission of two OBSS Wi-Fi nodes is based on the Public Action frame Request-Simultaneous-Transmission (RST), shown in FIG. 2, and the Public Action frame Clear-to-Simultaneous-Transmission (CST) shown in FIG. 3.

Note in FIGS. 2 and 3 that the depicted frame types are Action Frames, i.e., a type of management frame used to trigger an action in a cell. The Category field describes the action frame type. These frames can include the conventional MAC header fields: Frame Control, Duration, RA and TA.

It should be noted however that the embodiments of this invention are not limited for use with Public Action frames. Public Action frames can be used since they are commonly employed for inter-BSS communication. However, the embodiments of this invention can also be implemented with Control frames, which may be more appropriate in some situations for fast responses. Whatever frame type is used it is preferable that the frames are not encrypted.

FIG. 2 shows the RST (management or control) frame. The NAV (Network Allocation Vector) of RST receivers is set for the complete transmission time with the "Duration" information element (IE), except for the addressed node (RA). "OBSS TA" is the address of the other BSS data transmitter, while "RST Options" has, for example, one bit to indicate if it is an RST1 (start of a Coordination Window), or an RST2 (a response to RST1). The remaining seven bits of the RST Options octet can be reserved.

FIG. 3 shows the CST (management or control) frame. The NAV of CST receivers is set for the complete transmission time with "Duration", except for the RST senders. "OBSS TA" is the address of the other BSS data transmitter. "RST Options" can have one bit to indicate if the simultaneous transmission is admitted, while the remaining seven bits of the octet can be reserved. One or more of these reserved bits may optionally be used to indicate a maximum MCS that can be accepted for a simultaneous transmission as discussed below.

Figure 4:
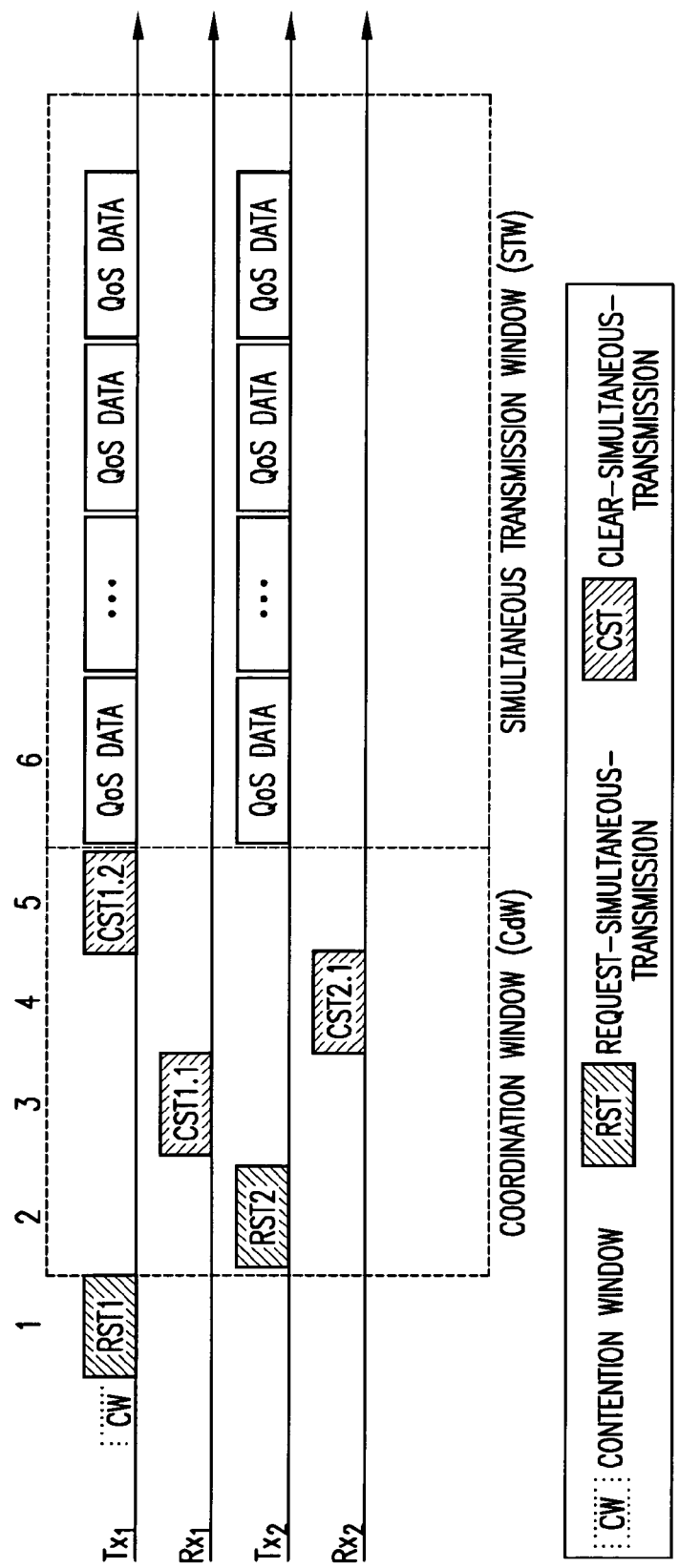
FIG. 4 illustrates a signaling mechanism and signaling temporal flow for the coordination of two simultaneous OBSS Wi-Fi transmissions using the RST and CST frames illustrated in FIGS. 2 and 3, respectively.

The signaling mechanism and flow for the coordination of two simultaneous OBSS Wi-Fi transmissions using the RST and CST frames of FIGS. 2 and 3 is described now with reference to FIG. 4. In this non-limiting example four Wi-Fi nodes are involved, as illustrated in FIG. 1, i.e., in BSS1 there are Tx1 and Rx1 while in BSS2 there are Tx2 and Rx2. It is assumed for this description that Tx1 and Tx2 listen to each other. Six steps are enumerated in FIG. 4 and described in detail below.

Step 1:

Tx1 gains access to the channel and transmits a RST1 frame. The RST1 frame protects the channel for the complete transmission time ("Duration"=s plus STW time). The addressed node ("RA"=Rx1 address) waits for RST2 plus SIFS (Short Interframe Space) to transmit CST1.1. The "OBSS TA=Tx2 address" indicates the potential simultaneous transmitter (from a list of OBSS nodes of Tx1); one bit in "RST Options" identifies the frame as RST1 (initiate the Coordination Window).

Tx1 can determine the existence of the potential simultaneous transmission Tx2 by various means. For example, there exists multi-BSS support in the IEEE specifications that provides a way for Tx1 to have knowledge of which other BSS nodes are in its coverage range. Tx1 can also use information on channel usage. For OBSS detection/discovery some available techniques include OBSS Scanning (IEEE 802.11n) and Neighbor Report (IEEE 802.11k). Regarding other BSS activity, a Channel Usage report (IEEE 802.11v) and a BSS Load information element (IE) in a Beacon transmission are available. By whatever mechanism or mechanisms are available it can be assumed that a node in an overlapped BSS area has access to information about other BSS nodes in its coverage range, and may also have knowledge of which BSSs have a high channel usage demand. In Step 1 the Tx1 can, for example, choose Tx2 from a list of OBSS nodes that currently have a high load. In a case where Tx2 has no data to transmit at that instant, it simply need not respond to the RST1 (Step 1) with an RST2 frame (FIG. 4) and only the Tx1 transmission will occur.

Step 2:

In response to receiving RST1, Tx2 transmits RST2, which protects the channel for the complete transmission time; the addressed node (Rx2) waits for CST1.1 plus SIFS to transmit CST2.1. The "OBSS TA=Tx1 address" indicates to Tx1 that this is a response to RST1; one bit in "RST Options" identifies the frame as RST2 (i.e., response to RST1).

It can be noted that RST2 is the response from TX2 to RST1 sent by Tx1. However, at the same time RST2 starts the transmission attempt in the second BSS by indicating the receiver (Rx2).

Step 3:

In response to receiving RST1, Rx1 waits for RST2 and measures the signal strength of both received RST frames. Based on some criterion (minimum SINR, for example) Rx1 determines whether it admits the (Tx1, Tx2) simultaneous transmission. Rx1 transmits CST1.1, which protects the receiver for the remaining transmission time; the "OBSS TA=Tx2 address" indicates the potential simultaneous transmitter. One bit in "CST Options" (see FIG. 3) indicates to Tx1 if the (Tx1, Tx2) simultaneous transmission is admitted by Rx1. Optionally, one or more of the seven reserved bits in "CST Options" can be used to indicate a maximum Modulation Coding Scheme (MCS) that Rx1 admits from Tx1 for the simultaneous transmission.

For example, and assuming the case where the SINR is the received signal metric considered by Rx1, if the SINR is below some threshold value then a more robust MCS can be indicated using one or more of the reserved bits in "CST Options". In general the MCS basic set may vary from MCS0-MCS7, i.e., from BPSK modulation with 1/2 code rate to 64 QAM with 5/6 code rate. Higher MCSs can be available for use if multiple input-multiple output (MIMO) type transmissions are used.

Step 4:

If Rx2 receives RST1, it measures the signal strength of the RST1 frame. By receiving RST2, Rx2 also measures the signal strength of the RST2 frame. Based on some criterion (minimum SINR, for example) Rx2 determines whether it admits the (Tx1, Tx2) simultaneous transmission. Rx2 transmits CST2.1, which protects the receiver for the remaining transmission time; where the "OBSS TA=Tx1 address" indicates the pioneer transmitter. One bit in "CST Options" indicates to Tx2 if (Tx1, Tx2) simultaneous transmission is admitted by Rx2. Optionally, one or more of the seven reserved bits in "CST Options" can be used to indicate the maximum MCS that Rx2 admits from Tx2 for this simultaneous transmission.

If Rx2 does not receive RST1, this implies that the Tx1 transmission does not cause interference to Rx2, and CST2.1 is sent to indicate that the simultaneous transmission is admitted by Rx2.

Step 5:

After transmitting RST1, Tx1 waits to receive CST frame from Rx1. Tx1 may also receive RST2 from Tx2 and CST frame Rx2. Tx1 receives from Rx1 through CST1.1 the indication of whether Rx1 admits the simultaneous transmission. Tx1 transmits CST1.2, which protects the channel for the remaining transmission time; where the "OBSS TA Tx2 address" indicates the potential simultaneous transmitter. One bit in "CST Options" of the transmitted CST1.2 indicates to Tx2 if the (Tx1, Tx2) simultaneous transmission is admitted by Rx1, since CST1.1 may not be received by Tx2.

With respect to Step 5 it can be noted that it is assumed that the transmitters, Tx1 and Tx2 in FIG. 1, are in overlapping BSSs and listen to each other. However, the respective receivers, Rx1 and Rx2, may not be in communication range of the other BSS transmitter. Therefore, the CST1.1 frame (FIGS. 4 and 5) sent by Rx1 may not be received by Tx2 and thus Tx2 would not know if its transmission is admitted. In order to assure that an acknowledgement is guaranteed that Tx2 receives the information as to whether its transmission is admitted by Rx1 or is not admitted then the message sent in Step 5 is used. However, this may not be needed because it seems unlikely, or a small possibility, that a STA can be heard and not the AP. In one example, if the Tx2 cannot hear CST1.1 (from the Rx1), it may re-use the channel. The Rx1 may allow the possibility of simultaneous transmission based on Tx1 and Tx2 reception power at Rx1.

If a system deployment were to be used where it could be guaranteed that the Rx nodes were capable of receiving transmissions from all applicable overlapping BSS transmitter nodes then perhaps the use of Step 5 could be made optional. However, such a system deployment could be difficult to guarantee in all cases and thus the performance of Step 5 is preferred.

Step 6:

After transmitting CST1.2, Tx1 waits for a SIFS to start data transmission. By receiving RST1, Tx2 transmits RST2. Tx2 receives from Rx2 and Tx1, through CST2.1 and CST1.2, the indications of whether Rx2 and Rx1 admit the simultaneous transmission. If the indications are positive, Tx2 starts transmission one SIFS after receiving CST1.2, otherwise, Tx2 does not transmit. There may be a case when there is no CTS1.2. In that case, the Tx2 may transmit after CTS2.1+SIFS (for instance enough time to receive the preamble). In one type of example embodiment it may be flexible for the STA1 to indicate whether it is going to transmit CTS1.2 or not so, in one example embodiment the Tx1 and Rx1 may both have to grant simultaneous transmission, while in another example embodiment only the Rx1 grants whether simultaneous transmission is allowed.

Since the reverse link transmission is not protected, the transmission of an acknowledge (ACK) is postponed until the next transmission time window. Also, if the pioneering transmission (Tx1, Rx1) fails, i.e., if CST1.1 and/or CST1.2 are not transmitted, then the second transmission link (Tx2, Rx2) is free to use the channel. Legacy devices understand that RST and CST are Public Action or Control frames, and are thus able to set their NAVs according to the "Duration" field of these frames.

The embodiments of this invention thus provide a 5-way handshake procedure for determining whether Tx1-Rx1 and Tx2-Rx2 device pairs may transmit simultaneously. The device pairs can be assumed to be locate in different wireless networks (for example, in overlapping Basic Service Sets).

FIG. 5 is a signaling diagram that presents another view of the signaling mechanism depicted in FIG. 4 where Steps 1-5 are also indicated. Several non-limiting assumptions that are made include: Tx1 and Tx2 can receive each others transmissions (i.e., Tx1 and Tx2 can 'hear' each other); Tx1 and Rx1 can hear each other; Tx2 and Rx2 can hear each other; Tx2 and Rx1 may not hear each other; Tx1 and Rx2 may not hear each other; and Rx1 and Rx2 do not hear each other.

In FIG. 5 a dotted arrow implies a signal transmission that is used if available. A circle on an arrow indicates the starting point (of a transmission) while the arrow head(s) indicate the receiving point(s) of the transmission.

There are various checks for the possibility of simultaneous transmission, shown in FIG. 5 as "determine coex (coexistence) possibility". In one case Rx1 checks whether it may receive simultaneously when Tx2 is transmitting (it is assumed that a Rx2 transmission (possibly only ACKs) does not interfere Rx1). Rx2 checks whether it may receive simultaneously when Tx1 is transmitting (it is assumed that a Rx1 transmission (possibly only ACKs) does not interfere Rx2). In addition, Tx2 checks whether Rx1 and Rx2 are acceptable for simultaneous reception (by receiving CTS2.1 and CST1.2)

In general the possibility for simultaneous transmissions is based on receiving RST1 and/or RST2 in Rx1 and Rx2. This may be where it is assumed that Rx1 and Rx2 do not interfere with each other. The receive link might not be protected so one may defer the ACK's.

In accordance with the embodiments of this invention Tx1 and Tx2 send certain frames, and both Rx1 and Rx2 check whether the transmission from the non-counterpart transmitter interferes with the reception of its own counterpart transmission. This information is then used by the Tx2 to determine whether it may transmit simultaneously with Tx1. In that Tx1 initially has 'won' the channel contention, it may always start data transmission after the resource reservation phase.

While described above in the context of certain examples of embodiments, this invention can be implemented by the use of other exemplary embodiments.

For example, it can be noted that address fields have traditionally receiver and transmitter addresses in sequence, and nodes filter received messages based on the receiver address to check whether the received transmission requires an immediate response from the node or is instead a message targeted to some other node. Thus, in an alternative embodiment the address fields can be established as: RST1 (RA=Tx2, TA=Tx1), RST2 (RA=Rx1, TA=Tx2). The OBSS TA field would be an address field, but it need not comprise the Tx2 address, but otherwise addressed based on need. As an example, it could comprise the Rx1 address in the case of RST1.

Thus, in the alternative embodiment the addressed node has its address indicated as soon as possible in the frame in order to allow for fast response. Independently from using Public Action frames or Control frames, this alternative embodiment of the invention could place the three addresses in the RST frame in the MAC header and, in this case, the frame body would contain only the field "RST Options".

FIG. 6 shows a non-limiting example of a RST Public Action frame construction for this alternative embodiment. As a Public Action frame the field "OBSS TA" in FIG. 2 is moved from the frame body to the frame header (MAC Header) and renamed as, for example, "DA", i.e., Destination Address. One reserved bit in the field Public Action may then be used to indicate the new frame type RST. In this example RA is the address of the node which has to respond within a SIFS, TA is the sender address, and DA is the address of the Rx node in the same BSS as the TA and that has to respond with a CST. If DA is Rx1, it receives RST1 and waits for a SIFS+RST2 time+SIPS to respond with CST1.1; while if DA is Rx2, it receives RST2 and waits for a SIFS+CST1.1 time+SIFS to respond with CST2.1 (see FIGS. 4 and 5).

In the case of a Control frame, the MAC header can be the same as in FIG. 6, and one reserved bit in the Subtype field of the Frame Control field can be used to indicate the new frame type RST. An example of a Control RST frame is illustrated in FIG. 7.

Further in accordance with these alternative examples of the embodiments of this invention the CST frame can also be a Public Action frame or a Control frame. In both cases the field "OBSS TA" can be moved from the body of the frame to the MAC header of the frame. For the Public Action frame (FIG. 8) one reserved bit in the field Public Action is used to indicate the new frame type of CST. In the case where the CST frame is a Control frame (FIG. 9), one reserved bit in the Subtype field of the Frame Control field can be used to indicate the new frame type of CST. In these alternative embodiments the RA field contains the address of the node that should receive the CST frame and the field OBSS TA indicates the other BSS transmitter.

As was previously explained the use of OBSS transmission coordination can improve high density Wi-Fi deployments. The embodiments of this invention establish a signaling protocol that provides a number of significant advantages. These advantages include, but are not limited to, providing a simple mechanism to coordinate two OBSS simultaneous transmissions in a decentralized manner; protecting the two simultaneous transmissions (or only one of them when the other is not admitted or fails), thereby avoiding data transmission collisions; improving channel spatial reuse and reducing time needed for performing CCA and backoff operations; and providing backward compatibility with legacy devices and networks.

In contradistinction to some CoMP approaches, such as in LTE, where there are two transmitters and one receiver (DL) or one transmitter and two receivers (UL), the embodiments of this invention address the situation of four nodes (e.g., Wi-Fi nodes) with two transmitters and two receivers.

The various embodiments of this invention provide the use of new management or control frames, i.e., RST (Request-Simultaneous-Transmission) and CST (Clear-to-Simultaneous-Transmission). The embodiments of this invention use the RST and CST frames to both: 1) evaluate the interference level at the receivers; and 2) inform whether the simultaneous transmission is admitted by the receivers.

The various embodiments of this invention provide a method and apparatus and system for enabling a decentralized coordination of simultaneous Wi-Fi transmissions in overlapping BSSs. No central coordination mechanism is required, thereby simplifying the overall construction and operation of the wireless communication system. The embodiments provide a signaling mechanism to simultaneously coordinate intra-BSS and the other (overlapping) BSS transmissions.

The various embodiments of this invention provide a method and apparatus and system that enable the exchange of a minimum number of frames which serve to evaluate the interference that one transmission causes to another transmission and to also inform whether simultaneous transmissions are admitted, and further enable a fallback position where only one transmission is enabled to occur when the simultaneous transmissions are deemed to not be currently admitted.

The use of the various embodiments of this invention improves channel spatial reuse (and user/network throughput) with parallel coordinated transmissions and reduces the amount of time consumed by CCA and backoff operations. This is true since by receiving RST1 and having the simultaneous transmission admitted (FIG. 4), the second transmitter bypasses any backoff waiting time and gains immediate access to the channel.

While it might be possible to employ just one RTS and multiple CTS frames, this approach would negate the possibility to coordinate and protect the simultaneous transmission of two Wi-Fi nodes in different but overlapped BSSs. To use but one RTS frame transmission the first transmitter, Tx1 in FIG. 4, would need to coordinate the transmission to its associated receiver, Rx1, (this could be in some common RTS/CTS-like scheme), but it would also need to initiate the coordination with the other BSS transmitter, Tx2. So, it would need to indicate the Rx1 and also the other BSS Tx2 for the simultaneous transmission. This would not be readily accomplished by using but one RTS frame transmission.

A similar situation can arise with respect to the use of multiple CTS frames. Just one CTS frame is a positive response to the transmission initiated with the RTS in the same BSS, while an indication is needed to indicate if the other BSS transmission is admitted by the receiver (CTS sender). In summary, the multiple RST and CST frames are used to at the same time coordinate the intra-BSS and the overlapping BSS transmissions.

With regard to missing frames, and referring to FIG. 4, the Coordination Window has a fixed (known) duration time. One simple approach to reset the NAV is to wait for a DIFS (referred to above) after the Coordination Window (or the Transmission Window start). In case no data transmission from the RST sender is observed after a DIFS, the NAV can be reset.

Further with regard to the possibility of missing frames and message failures, consider the behavior if any message fails. As a general comment: Tx1 and Tx2 are assumed to listen to each other, but the transmitter of a BSS does not necessarily listen to the receiver of another BSS (the situation represented in FIG. 1). Therefore, the failure of a frame sent by a receiver is not considered as a trigger for the action of the other BSS transmitter.

Consider as a first case that the RST1 frame is missed by Tx2. If Tx2 does not receive/decode RST1, Tx2 continues with the conventional backoff procedure. It will not send RST2 and Rx2 will not respond with CST2.1. By not receiving/decoding RST2 from Tx2, Tx1 waits for the CST1.1 from its associated receiver Rx1, and starts its transmission one SIFS later. In this case then only the (Tx1, Rx1) transmission will occur.

Consider as a second case that Rx1 does not receive/decode RST1. As a result Rx1 will not send CST1.1, and the (Tx1, Rx1) transmission will not occur as in a conventional RTS/CTS approach. There is no change in the remaining coordination mechanism, with Tx1 sending CST1.2 to indicate that the second transmission is admitted. CST1.2 is still needed because Rx1 is not necessarily in range of Tx2, and Tx2 not receiving CST1.1 does not necessarily mean that the first transmission (Tx1, Rx1) failed. Then, if the RST2/CST2.1 frame exchange is successful, only the second transmission (Tx2, Rx2) will occur.

Consider as a third case that Tx1 does not receive/decode RST2. Tx1 then waits for the CST1.1 from its associated receiver Rx1, and begins its transmission one SIFS later. As a result only (Tx1, Rx1) transmission will occur.

Consider as a fourth case that Rx2 does not receive/decode RST2. Rx2 then does not send CST2.1 and the (Tx2, Rx2) transmission does not occur, as in a conventional RTS/CTS scheme. There is no change in the remaining coordination mechanism, with Tx1 sending CST1.2. CST1.2 is still needed because Rx2 may not be in range of Tx1, and Tx1 not receiving CST2.1 does not necessarily mean that the second transmission (Tx2, Rx2) failed. Then, if the RST1/CST1.1 frame exchange is successful, only the first transmission (Tx1, Rx1) will occur.

As was noted above, if Rx2 does not receive RST1 it can be implied that the Tx1 transmission does not cause interference to Rx2, and CST2.1 is sent to indicate that the simultaneous transmission is admitted by Rx2.

Consider as a fifth case that the CST1.1 frame is missed by Tx1. If Tx1 does not receive/decode CST1.1 then the (Tx1, Rx1) transmission will not occur, as in a conventional RTS/CTS scheme. There is no change in the remaining coordination mechanism, with Tx1 sending CST1.2 to indicate that the second transmission is admitted. CST1.2 is still needed because Rx1 may not be in range of Tx2, and Tx2 not receiving CST1.1 does not necessarily mean that the first transmission (Tx1, Rx1) failed. Then, if the RST2/CST2.1 frame exchange is successful, only the second transmission (Tx2, Rx2) will occur.

Consider as a sixth case that the CST2.1 frame is missed by Tx2. If Tx2 does not receive/decode CST2.1 then the (Tx2, Rx2) transmission will not occur, as in a conventional RTS/CTS scheme. There is no change in the remaining coordination mechanism, with Tx1 still sending CST1.2 because Rx2 may not be range of Tx1 and thus Tx1 not receiving CST2.1 does not necessarily mean that the second transmission (Tx2, Rx2) failed. If the RST1/CST1.1 frame exchange is successful, only the first transmission (Tx1, Rx1) will occur.

Consider as a seventh case that the CST1.2 frame is missed by Tx2. If Tx2 does not receive/decode CST1.2 then the (Tx2, Rx2) transmission will not occur. As a result, and if the RST1/CST1.1 frame exchange is successful, only the first transmission (Tx1, Rx1) will occur.

It is noted that in a still further embodiment of this invention Message 5 (sent in Step 5) may not be used. By not receiving CST1.1 from Rx1, Tx2 is likely to not cause interference to Rx1. As a result Tx2 could transmit data after receiving CST2.1 from its associated receiver Rx2.

A WLAN challenge has been that not all devices hear each other. In this invention a different problem is addressed: the transmitters not only hear each other, but block each other, thereby avoiding an efficient channel spatial reuse with parallel transmissions. The self-coordinated OBSS transmissions in accordance with the embodiments of this invention improve spatial reuse and overcome this problem.

Figure 10:
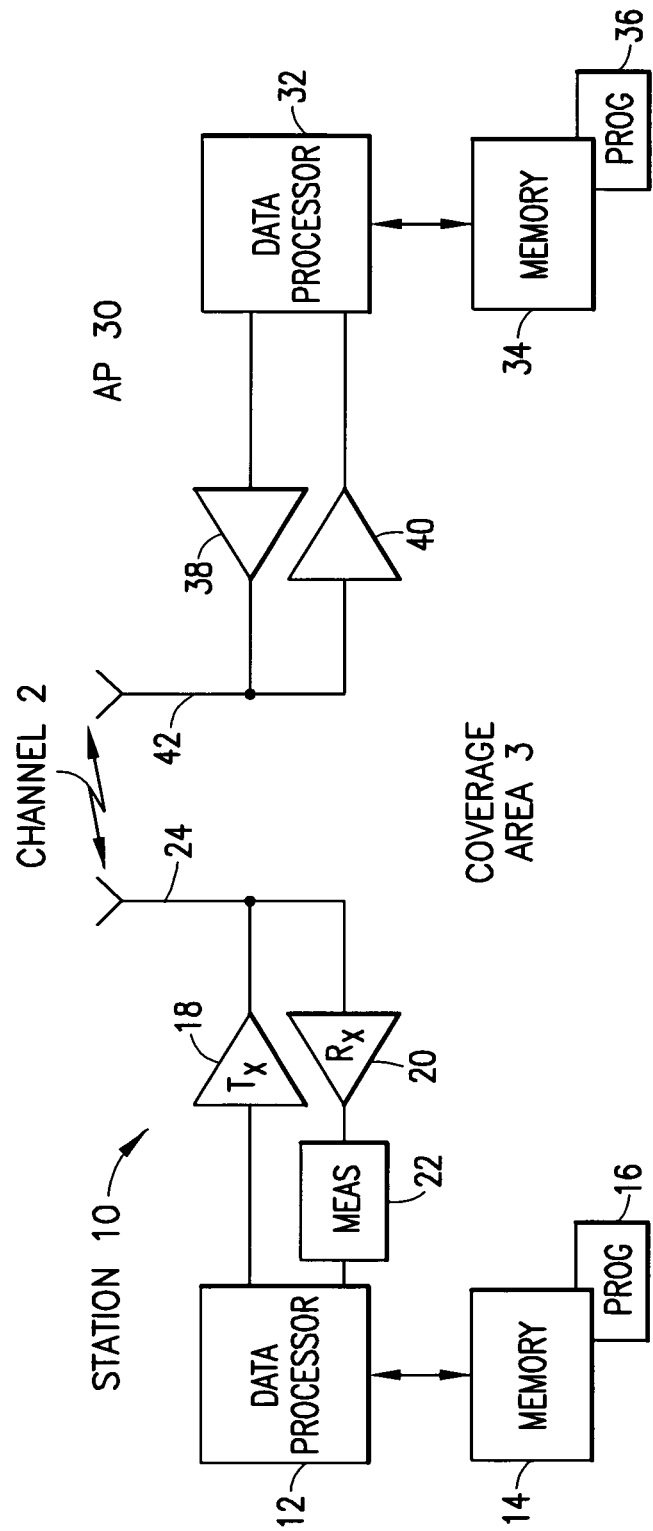
FIG. 10 is a simplified block diagram of apparatus that can be used to implement the embodiments of this invention.

FIG. 10 illustrates a simplified block diagram of various electronic devices and apparatus that are suitable for use in practicing the embodiments of this invention. In FIG. 10 a first wireless communication system 1, such as a first BSS, is adapted for communication over a wireless link (channel 2) between an access point (AP) 30 and a station (STA) 10. The station 10 can be a mobile communication device. Not shown in FIG. 10 is a second wireless communication system, such as a second BSS. The first BSS and the second BSS can each be WiFi capable and for the purposes of this invention can be considered as having at least partially overlapping coverage areas (CAs) 3. In practice there can be a number of stations 10 in range of the AP 30 and thus within the coverage area of the BSS, and there can be more than two overlapping CAs in a particular location.

As an example, the AP 30 could take the role of the Tx1 or the Tx2 and the station 10 could take the role of the Rx1 or the Rx2 shown in FIGS. 4 and 5.

The station10 includes a controller, such as at least one computer or data processor 12, at least one non-transitory computer-readable memory medium embodied as a memory 14 that stores a program of computer instructions (PROG) 16, and at least one suitable radio frequency (RF) transmitter (Tx) 18 and receiver (Rx) 20 pair (transceiver) for bidirectional wireless communications with the AP 30 via at least one antenna 24. Associated with the receiver 20 is a measurement (MEAS) functional unit or block whereby some characteristic of a received radio frequency signal can be ascertained, such as the SINR.

The AP 30 includes a controller, such as at least one computer or data processor 32, at least one non-transitory computer-readable memory medium embodied as a memory 34 that stores a program of computer instructions (PROG) 36, and at least one suitable radio frequency (RF) transmitter (Tx) 38 and receiver (Rx) 40 pair (transceiver) for bidirectional wireless communications with the AP 30 via at least one antenna 42. Not shown in FIG. 10 is the connection of AP 30 to at least one external network such as the Internet or a LAN as two non-limiting examples. The station 10 is thus enabled to communicate via the AP 30 with one or more external devices (e.g., servers) that are connected to the external network.

The programs 16 and 36 are assumed to include program instructions that, when executed by the associated data processor, enable the device to operate in accordance with the exemplary embodiments of this invention as was discussed above and shown in, for example, FIGS. 4 and 5. The embodiments of this invention may be implemented at least in part by computer software executable by the data processor 12 of the station 10 and by the data processor 32 of the AP 30, or by hardware, or by a combination of software and hardware (and firmware).

The various data processors, memories, programs, transceivers and other functional units depicted in FIG. 10 can all be considered to represent means for performing operations and functions that implement the several non-limiting aspects and embodiments of this invention. As should thus be appreciated the details of the construction of these various devices can vary widely and, in many cases, can be implementation-specific. Further, it should be appreciated that the several devices, components, sub-systems and the like depicted in FIG. 10, separately and in combination, may be viewed as representing various means for implementing the exemplary embodiments of this invention.

In general, the various embodiments of the station 10 can include, but are not limited to, cellular mobile devices having WiFi capability, personal digital assistants (PDAs) having WiFi capability, portable and desktop computers having WiFi capability, image capture devices such as digital cameras having WiFi capability, gaming devices having WiFi capability, music storage and playback appliances having WiFi capability, Internet appliances permitting wireless Internet access and browsing, as well as units or terminals or devices that incorporate combinations of such functions. The AP 30 could be implemented, for example, as a wireless router or some other device providing WiFi connectivity to the Internet or to a public or private LAN.

The computer-readable memories 14 and 34 may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 12 and 32 may be of any type suitable to the local technical environment, and may include one or more of general purpose computers, special purpose computers, microprocessors, embedded controller chips, digital signal processors (DSPs), application specific integrated circuits (ASICs) and processors based on multi-core processor architectures, as non-limiting examples.

Based on the foregoing it should be apparent that the exemplary embodiments of this invention provide a method, apparatus and computer program(s) to operate a BSS in an overlapping BSS environment.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, signal flow diagrams, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, and as was noted previously, while the embodiments have been described above in the context of a WiFi system, it should be appreciated that the embodiments of this invention are not limited for use with only this one particular type of wireless communication system, and that they may be used to advantage in other wireless communication systems.

It is thus pointed out that in some embodiments the underlying radio frequency communications may conform to some protocol or protocols other than those typically associated with a WiFi protocol and environment. In such a situation the frames may be formatted differently and may include more or fewer information elements than shown in FIGS. 2, 3 and 6-9, the information elements could be arranged in a different order within a frame, and the information elements could each be composed of the same or a different number of octets, or more generally a different number of bits, than those specifically illustrated.

Further in this regard the various names used for the described frames and information elements contained therein are not intended to be limiting in any respect, as the frames and information elements may be identified by any suitable names.

One type of example method receiving from a first node at a second node a first frame comprising a first type of message, the first node being associated with a first wireless communication system and the second node being associated with a second wireless communication system. The first type of message comprises a first information element for identifying the second node and a second information element for specifying that the first frame was transmitted to initiate a request for simultaneous transmission by the first node and by the second node. The first frame is also addressed to a third node that comprises part of the first wireless communication system. Transmitting from the second node to a fourth node a second frame comprising the first type of message, the second frame identifying the first node and specifying that the second frame is transmitted in response to the first frame that was received by the second node. The fourth node comprises part of the second wireless communication system. The method further includes receiving at the second node, based on a measurement performed by the fourth node on at least the second frame, a third frame comprising a second type of message. The second type of message identifies the first node and comprises an indication whether the request for simultaneous transmission is accepted or is not accepted by fourth node. If the fourth node cannot tolerate the interference from the first pair, it may just choose not to send the CTS2.1 instead of sending a message indicating that the request is accepted or not. The method further includes receiving at the second node a fourth frame comprising the second type of message, where the second type of message identifies the second node and comprises an indication whether the request for simultaneous transmission was accepted by the third node. The method further includes making a determination at the second node, based on the received third frame and the received fourth frame, whether to perform a simultaneous transmission with the first node.

In one example the order may be the STA1, belonging to BSS1, sends a RST1 followed by a RST2 from STA2, belonging to BSS2, followed by a CST1.1 from a STA3 belonging to BSS1. The second frame may be the CST1, but the CST1 may not be transmitted before the RST2. An example may comprise the first frame=RST1, the second frame=RST2, the third frame=CST1.1, the fourth frame=CST2.1, and the fifth frame=CST1.2 as show in FIG. 4. The Tx1 does not need to be able to receive RST2 (if e.g. tx power of Tx2 is lower) and CST1.2.

It should also be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:
1. A method, comprising:
transmitting a first frame comprising a first type of message from a first node for reception by a second node, the first node being associated with a first wireless communication system and the second node being associated with a second wireless communication system, the first type of message comprising a first information element for identifying the second node and a second information element for specifying that the first frame is transmitted to initiate a request for simultaneous transmission by the first node to a third node and by the second node to a fourth node, the first frame also being received by the third node that comprises part of the first wireless communication system;
receiving from the third node a second frame comprising a second type of message, the second type of message identifying at least the first node and specifying, based on a measurement performed by the third node on the first frame and a measurement performed by the third node on a third frame transmitted by the second node, whether the request for simultaneous transmission is accepted or is not accepted by the third node; and transmitting a fourth frame comprising the second type of message from the first node for reception by the second node, the second type of message identifying the second node and specifying that the request for simultaneous transmission was accepted by the third node.

2. The method of claim 1, where the first wireless communication system comprises a first basic service set, where the second wireless communication system comprises a second basic service set, and where a coverage area of the first basic service set overlaps a coverage area of the second basic service set.

3. The method of claim 1, wherein the first frame and the second frame are reservation request frames, and where the third frame is a response to the first frame and the fourth frame is a response to the second frame.

4. The method of claim 1, where the first frame is for establishing a connection for data transmission between the first node and the third node, and where the first type of message comprising the first information element also identifies the third node using the same or a different information element.

5. A method, comprising:
receiving from a first node at a second node a first frame comprising a first type of message, the first node being associated with a first wireless communication system and the second node being associated with a second wireless communication system, the first type of message comprising a first information element for identifying the second node and a second information element for specifying that the first frame was transmitted to initiate a request for simultaneous transmission by the first node to a third node and by the second node to a fourth node, the first frame also being addressed to the third node that comprises part of the first wireless communication system;
transmitting from the second node to the fourth node a second frame comprising the first type of message, the second frame identifying the first node and specifying that the second frame is transmitted in response to the first frame that was received by the second node, the fourth node comprising part of the second wireless communication system;
receiving at the second node, based on a measurement performed by the fourth node on at least the second frame, a third frame comprising a second type of message, the second type of message identifying the first node;
receiving at the second node a fourth frame comprising the second type of message, the second type of message identifying the second node and comprising an indication whether the request for simultaneous transmission was accepted by the third node; and
making a determination at the second node, based on the received third frame and the received fourth frame, whether to perform a simultaneous transmission with the first node.

6. The method of claim 5, where the first wireless communication system comprises a first basic service set, where the second wireless communication system comprises a second basic service set, and where a coverage area of the first basic service set overlaps a coverage area of the second basic service set.

7. The method of claim 5, wherein the first frame and the second frame are reservation request frames, and where the third frame is a response to the first frame and the fourth frame is a response to the second frame.

8. The method of claim 5, where the first frame is for establishing a connection for data transmission between the first node and the third node, and where the first type of message comprising the first information element also identifies the third node using the same or a different information element.

9. A method, comprising:
receiving at a third node a first frame comprising a first type of message transmitted from a first node for reception by a second node, the first node and the third node being associated with a first wireless communication system and the second node being associated with a second wireless communication system, the first type of message comprising a first information element for identifying the second node and a second information element for specifying that the first frame is transmitted to initiate a request for simultaneous transmission by the first node to the third node and by the second node to a fourth node; and
transmitting from the third node to the first node a second frame comprising a second type of message, the second type of message identifying the second node and specifying, based on a measurement performed by the third node on the first frame and a measurement performed by the third node on a second frame transmitted by the second node in response to receiving the first frame, whether the request for simultaneous transmission is accepted or is not accepted by the third node.

10. The method of claim 9, where the first wireless communication system comprises a first basic service set, where the second wireless communication system comprises a second basic service set, and where a coverage area of the first basic service set overlaps a coverage area of the second basic service set.

11. The method of claim 9, wherein the first frame and second frame are reservation request frames, and where the first frame is for establishing a connection for data transmission between the first node and the third node.

12. An apparatus comprising:
a transmitter and a receiver;
at least one data processor; and
at least one memory including computer program code, where the at least one memory and computer program code are configured, with the at least one data processor, to cause the apparatus at least to transmit a first frame comprising a first type of message from a first node for reception by a second node, the first node being associated with a first wireless communication system and the second node being associated with a second wireless communication system, the first type of message comprising a first information element for identifying the second node and a second information element for specifying that the first frame is transmitted to initiate a request for simultaneous transmission by the first node to a third node and by the second node to a fourth node, the first frame also being received by the third node that comprises part of the first wireless communication system;
receive from the third node a second frame comprising a second type of message, the second type of message identifying at least the first node and specifying, based on a measurement performed by the third node on the first frame and a measurement performed by the third node on a third frame transmitted by the second node, whether the request for simultaneous transmission is accepted or is not accepted by the third node; and transmit a fourth frame comprising the second type of message from the first node for reception by the second node, the second type of message identifying the second node and specifying that the request for simultaneous transmission was accepted by the third node.

13. The apparatus of claim 12, where the first wireless communication system comprises a first basic service set, where the second wireless communication system comprises a second basic service set, and where a coverage area of the first basic service set overlaps a coverage area of the second basic service set.

14. The apparatus of claim 12, where the first frame and the second frame are reservation request frames, and where the third frame is a response to the first frame and the fourth frame is a response to the second frame.

15. The apparatus of claim 12, where the first frame is for establishing a connection for data transmission between the first node and the third node, where the first type of message comprising the first information element also identifies the third node using the same or a different information element.

16. An apparatus comprising:
a transmitter and a receiver;
at least one data processor; and
at least one memory including computer program code, where the at least one memory and computer program code are configured, with the at least one data processor, to cause the apparatus at least to receive from a first node at a second node a first frame comprising a first type of message, the first node being associated with a first wireless communication system and the second node being associated with a second wireless communication system, the first type of message comprising a first information element for identifying the second node and a second information element for specifying that the first frame was transmitted to initiate a request for simultaneous transmission by the first node to a third node and by the second node to a fourth node, the first frame also being addressed to the third node that comprises part of the first wireless communication system;
transmit from the second node to the fourth node a second frame comprising the first type of message, the second frame identifying the first node and specifying that the second frame is transmitted in response to the first frame that was received by the second node, the fourth node comprising part of the second wireless communication system;
receive at the second node, based on a measurement performed by the fourth node on at least the second frame, a third frame comprising a second type of message, the second type of message identifying the first node and comprising an indication whether the request for simultaneous transmission is accepted or is not accepted by fourth node;
receive at the second node a fourth frame comprising the second type of message, the second type of message identifying the second node and comprising an indication whether the request for simultaneous transmission was accepted by the third node; and
make a determination at the second node, based on the received third frame and the received fourth frame, whether to perform a simultaneous transmission with the first node.

17. The apparatus of claim 16, where the first wireless communication system comprises a first basic service set, where the second wireless communication system comprises a second basic service set, and where a coverage area of the first basic service set overlaps a coverage area of the second basic service set.

18. The apparatus of claim 16, wherein the first frame and the second frame are reservation request frames, and where the third frame is a response to the first frame and the fourth frame is a response to the second frame.

19. The apparatus of claim 16, where the first frame is for establishing a connection for data transmission between the first node and the third node, where the first type of message comprising the first information element also identifies the third node using the same or a different information element.

20. An apparatus comprising:
a transmitter and a receiver;
at least one data processor; and
at least one memory including computer program code, where the at least one memory and computer program code are configured, with the at least one data processor, to cause the apparatus at least to receive at a third node a first frame comprising a first type of message transmitted from a first node for reception by a second node, the first node and the third node being associated with a first wireless communication system and the second node being associated with a second wireless communication system, the first type of message comprising a first information element for identifying the second node and a second information element for specifying that the first frame is transmitted to initiate a request for simultaneous transmission by the first node to the third node and by the second node to a fourth node; and
transmit from the third node to the first node a second frame comprising a second type of message, the second type of message identifying the second node and specifying, based on a measurement performed by the third node on the first frame and a measurement performed by the third node on a second frame transmitted by the second node in response to receiving the first frame, whether the request for simultaneous transmission is accepted or is not accepted by the third node.

21. The apparatus of claim 20, where the first wireless communication system comprises a first basic service set, where the second wireless communication system comprises a second basic service set, and where a coverage area of the first basic service set overlaps a coverage area of the second basic service set.

22. The apparatus of claim 20, wherein the first frame and the second frame are reservation request frames, where the first frame is for establishing a connection for data transmission between the first node and the third node.

23. A system comprising:
a first node comprising a first transmitter, a first receiver, at least one first processor and at least one first memory including first computer code, where the at least one first memory and first computer program code are configured, with the at least one first processor, to cause the first node at least to:
transmit a first frame comprising a first type of message from the first node for reception by a second node, the first node being associated with a first wireless communication system and the second node being associated with a second wireless communication system, the first type of message comprising a first information element for identifying the second node and a second information element for specifying that the first frame is transmitted to initiate a request for simultaneous transmission by the first node and by the second node, the first frame also being received by a third node that comprises part of the first wireless communication system;

receive from the third node a second frame comprising a second type of message, the second type of message identifying at least the first node and specifying, based on a measurement performed by the third node on the first frame and a measurement performed by the third node on a third frame transmitted by the second node, whether the request for simultaneous transmission is accepted or is not accepted by the third node; and transmit a fourth frame comprising the second type of message from the first node for reception by the second node, the second type of message identifying the second node and specifying that the request for simultaneous transmission was accepted by the third node; and the second node comprising a second transmitter, a second receiver, at least one second processor and at least one second memory including second computer code, where the at least one second memory and second computer program code are configured, with the at least one processor, to cause the second node at least to:

receive from the first node at the second node a first frame comprising a first type of message, the first node being associated with a first wireless communication system and the second node being associated with a second wireless communication system, the first type of message comprising a first information element for identifying the second node and a second information element for specifying that the first frame was transmitted to initiate a request for simultaneous transmission by the first node and by the second node, the first frame also being addressed to the third node that comprises part of the first wireless communication system;

transmit from the second node to a fourth node a second frame comprising the first type of message, the second frame identifying the first node and specifying that the second frame is transmitted in response to the first frame that was received by the second node, the fourth node comprising part of the second wireless communication system;

receive at the second node, based on a measurement performed by the fourth node on at least the second frame, a third frame comprising a second type of message, the second type of message identifying the first node and comprising an indication whether the request for simultaneous transmission is accepted or is not accepted by fourth node;

receive at the second node a fourth frame comprising the second type of message, the second type of message identifying the second node and comprising an indication whether the request for simultaneous transmission was accepted by the third node; and make a determination at the second node, based on the received third frame and the received fourth frame, whether to perform a simultaneous transmission with the first node; and the third node comprising a third transmitter, a third receiver, at least one third processor and at least one third memory including third computer code, where the at least one third memory and third computer program code are configured, with the at least one processor, to cause the third node at least to:

receive at the third node a first frame comprising a first type of message transmitted from the first node for reception by the second node, the first node and the third node being associated with a first wireless communication system and the second node being associated with a second wireless communication system, the first type of message comprising a first information element for identifying the second node and a second information element for specifying that the first frame is transmitted to initiate a request for simultaneous transmission by the first node and by the second node; and transmit from the third node to the first node a second frame comprising a second type of message, the second type of message identifying the second node and specifying, based on a measurement performed by the third node on the first frame and a measurement performed by the third node on a second frame transmitted by the second node in response to receiving the first frame, whether the request for simultaneous transmission is accepted or is not accepted by the third node.

* * * * *